UNITED STATES PATENT OFFICE.

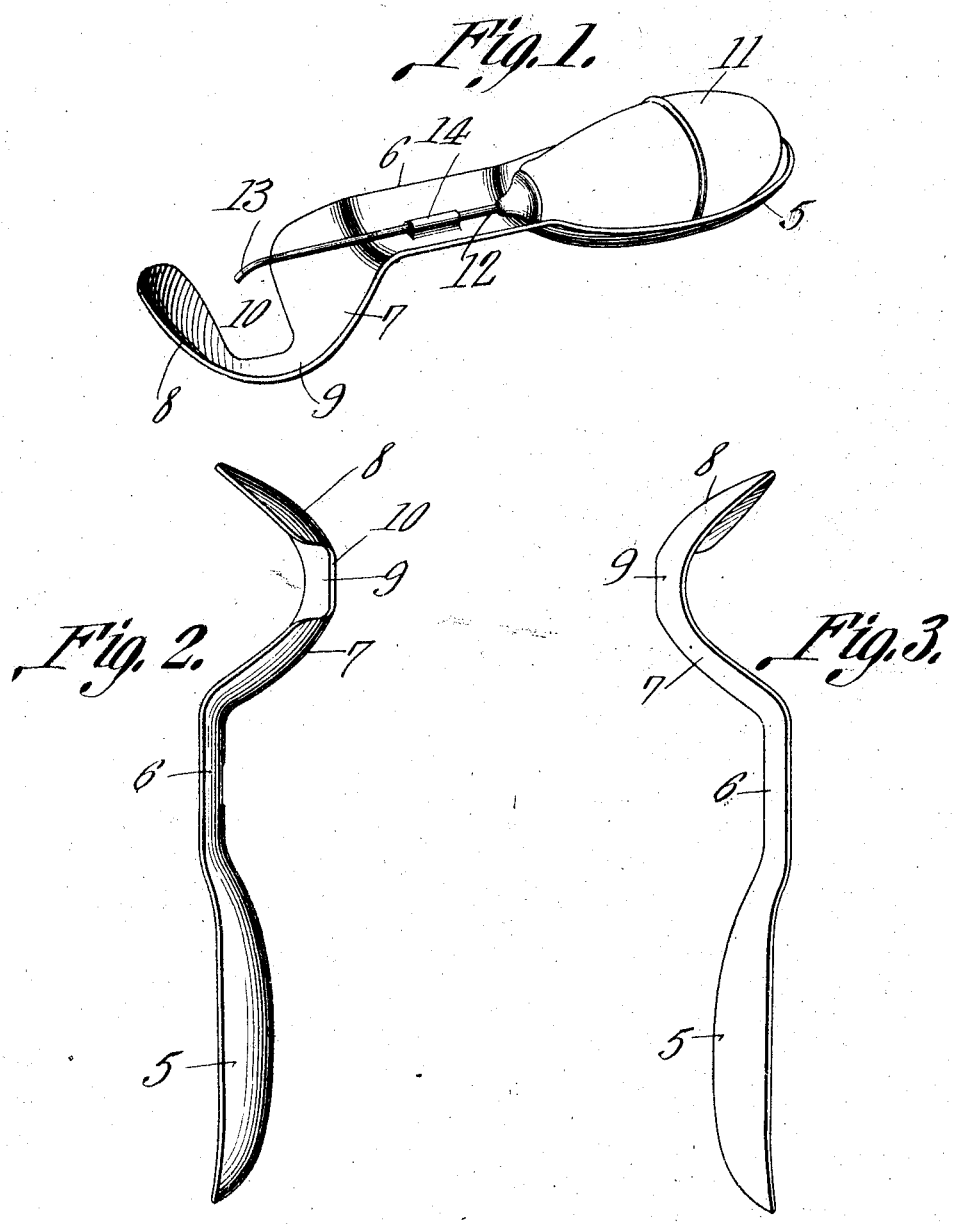

CHAPIN F. LAUDERDALE, OF LYONS, OHIO.

DENTAL INSTRUMENT.

990,277. Specification of Letters Patent. Patented Apr. 25, 1911.

Application filed August 15, 1910. Serial No. 577,137.

*To all whom it may concern:*

Be it known that I, CHAPIN F. LAUDERDALE, a citizen of the United States, residing at Lyons, in the county of Fulton and State of Ohio, have invented a new and useful Dental Instrument, of which the following is a specification.

The device which is the subject of the present invention is designed to be used in dental operations for depressing the tongue, cheek and lips of the patient, where a free and through exposure of the posterior teeth is wanted; and it is the object of the invention to provide an efficient and easily handled device of this character, and also to combine with the same a water dropper for moistening the bur or grinding wheel when the same is in operation, the application of water to the bur dissipating the heat generated thereby, and increasing its cutting capacity.

The invention is illustrated in the accompanying drawing forming a part of this specification, in which—

Figure 1 is a perspective view of the device. Figs. 2 and 3 are edge views taken from different sides.

The device is formed of some suitable thin metal, and, as shown in the drawing, comprises a handle portion 5 which is shaped similar to the bowl of a spoon, and from which extends a shank 6 having a peculiarly shaped terminal portion to adapt the same to the mouth of the patient, and which terminal portion is employed to depress the tongue, cheek and lip of the patient during the dental operation. The shank is concavo-convex in cross section, the concave portion being on the same side of the device as the concave portion of the handle, and forming a continuation thereof.

At the extremity of the shank 6 is a laterally curved portion 7 terminating in a forward curve 8. The parts 7 and 8, at their junction, are reduced, as indicated at 9, thus forming a recess 10 on one side of the device, which recess is for a purpose to be presently described, and which, by reason of the lateral bend 7, is offset from one side of the shank 6, the bend being from the convex side of the shank. The edges of the recess are without sharp corners, the latter being avoided by curves. The parts 7 and 8 are shaped so that they may be placed in the mouth of the patient with a minimum amount of discomfort, they being made concavo-convex in cross section, and the convex sides being on the same side of the device as the convex sides of the handle and the shank. The parts 7 and 8, when the device is in use, serve to depress the tongue, cheek and lip of the patient, and the recess 10 renders the tooth to be operated on more readily accessible.

The water dropper comprises a rubber bulb 11 of ordinary construction, provided with a discharge tube 12 terminating in a laterally curved tip 13. The bulb lies in the concave portion of the handle 5, and the tube extends along the concave side of the shank, and terminates adjacent to the recess, so that the water may be discharged therethrough onto the bur. The dropper is held in place by means of a sleeve 14 formed on the shank 6, through which sleeve the tube 12 loosely passes, so that the dropper may be removed if desired, and also adjusted as will be presently described.

The device can be used for any dental operation where a free and thorough exposure of the posterior teeth is wanted, the tongue, cheek and lip of the patient being readily depressed by the parts 7 and 8. The water dropper provides a handy and convenient means for applying water to the bur for dissipating the heat generated thereby, which materially increases its cutting capacity.

The device will be highly polished so as to act as a reflector to concentrate the light on the tooth to be operated on.

The spoon shaped handle renders the device easy to control, and also protects the bulb, preventing the water from being ejected before wanted. The curved tip of the tube 12 may be rotated, or slipped back and forth to allow the water being dropped on any spot desired.

The handle is joined to the retractor at an angle which requires simply a rotary motion of the handle to concentrate the light on any desired place.

The device can be held with a straight and uncramped wrist, the fore-arm resting on the head rest at the side of the patient's head. In practice the device will be made for entrance at the right or left corner of the mouth.

What is claimed is:—

1. A dental instrument comprising a handle, and a shank terminating in a laterally curved and enlarged portion which is concavo-convex in cross section.

2. A dental instrument comprising a handle, and a shank terminating in a laterally curved and enlarged portion, the handle and shank being concavo-convex in cross section, and the enlarged portion being also concavo-convex in cross section, and projecting from the convex side of the shank.

3. A dental instrument comprising a spoon shaped handle, a shank extending therefrom, said shank being concavo-convex in cross section, and terminating in a laterally curved and enlarged portion having a recess in one of its edges, and a fluid dropper comprising a bulb mounted in the concavity of the handle, and having an outlet tube extending along the shank in the concave portion thereof, and terminating adjacent to the recess to discharge therethrough.

4. A dental instrument comprising a handle, a shank extending therefrom and terminating in a laterally curved and enlarged portion having a recess in one of its edges, a water dropper comprising a bulb mounted on the handle, and having a discharge tube extending along the shank, and terminating adjacent to the recess to discharge therethrough, said tube being rotatable and longitudinally adjustable with respect to the shank.

In testimony that I claim the foregoing as my own, I have hereto affixed my signature in the presence of two witnesses.

CHAPIN F. LAUDERDALE.

Witnesses:
  C. B. SLATER,
  D. S. BAKER.